United States Patent Office 3,492,138
Patented Jan. 27, 1970

3,492,138
MINERAL GRINDING AIDS
Frank G. Serafin, Peabody, Mass., assignor to W. R. Grace & Co., Cambridge, Mass., a corporation of Connecticut
No Drawing. Filed May 15, 1967, Ser. No. 638,561
Int. Cl. C04b 7/54
U.S. Cl. 106—102                3 Claims

ABSTRACT OF THE DISCLOSURE

Furan and thiophene and derivatives thereof increase the grinding efficiency and pack set characteristics of minerals especially cement clinker.

---

This invention relates to grinding minerals and more particularly to the use of an additive for improving the grinding efficiency of minerals.

In the processing of minerals a grinding operation is generally employed either in the unprocessed or semi-processed state to reduce the particular mineral to a relatively small particle size. It is desirable in this grinding step to have as efficient an operation as possible. That is, to reduce the particular mineral to the desired particle size at a relatively rapid rate.

A grinding aid is frequently employed in such a grinding operation to assist in the grinding of the materials either by increasing the rate of production or by increasing the fineness of the particles at the same rate of production without having adverse effects on any of the properties of the ground product.

A novel additive has now been found which will function as a grinding aid for minerals. The novel additive comprises furans and thiophenes and the saturated and unsaturated derivatives. The terminology "furan and thiophene" is intended to refer to the named compounds, as well as their aldehydes, amides, alcohols, amines, esters and organic salts. It should also be understood that the furan and thiophene rings may be substituted by e.g. alkyl groups, preferably methyl halogen groups, preferably chlorine, aryl groups, preferably phenyl, and ethers.

As examples of suitable additives within the scope of the present invention, mention may be made of the following: furan, tetrahydrofuran, thiophene, tetrahydrothiophene, tetrahydrofurfuryl alcohol, furfuryl alcohol, furfural, dimethylfuran, furfuryl acetate, furfuryl diacetate, tetrahydrofurfuryl acetate, furoin, hydrofurfuramide, tetrahydrofurfurylamine, tetrahydrofurfurylamine acetate.

The additive is interground with the mineral in the grinding mill to provide increased grinding efficiency as well as other advantageous results, e.g. an increase in the strength of concrete.

The term "mineral" as employed herein is intended to refer to naturally occurring inorganic minerals such as phosphate rock, partially processed minerals such as iron ore, and mixtures of minerals such as cement clinker. As examples of minerals which can be processed with the additives of the present invention, mention may be made of beryllium oxide, limestone, gypsum, clays and bauxite.

The grinding aids of the present invention are particularly useful for grinding cement, particularly portland cement.

Portland cement represents a class of hydraulic cements, and is comprised essentially of two calcium silicates, lesser amounts of calcium aluminate and a calcium aluminoferrite. These silicates are processed into a mixture of finely divided calcareous material (limestone) and argillaceous material (clay) to form a clinker. The clinker is ground with the addition of about 5% gypsum or some other form of calcium sulfate to obtain the desired setting qualities in the finished cement. It is to the clinker that the additive is preferably added to increase grinding efficiency and to provide increased 1, 7, and 28 day strength in the finished concrete.

The additives of the present invention are employed here in dry or liquid form. For convenience, the additive is in water solution to permit accurate metering into the mill stream. In instances where the additive is not very soluble in water, it can be utilized in liquid form by emulsifying with suitable wetting agents, such as sodium dodecyl benzene sulphonate. The addition is accomplished either prior to the grinding, or the additive is introduced into the grinding mill simultaneously with the mineral. If the additive is employed merely by providing an increase in the strength of the concrete, it is added at any convenient point in the processing.

The additive is employed effectively over a relatively wide range. A preferred range is about 0.001 to 1% based on the weight of the mineral, i.e. the weight of the additive solids based on the weight of mineral solids (herein referred to as solids on solids). In a particularly preferred embodiment the amount of additive employed is about .004% to .04%, more preferably .02%.

The following non-limiting examples illustrate the employment of the novel additives of the present invention.

Type I portland cement clinker was ground in a laboratory steel ball mill for 5490 revolutions at room temperature. The following table reports the results of the grinding test.

TABLE 1

| Additive | Amount of additive, percent solids on solids | Blaine surface area, sq. cm./g. | Percent improvement over blank |
|---|---|---|---|
| Blank | | 2,966 | |
| Furan | 0.039 | 3,098 | 4.44 |
| Thiophene | 0.048 | 3,132 | 5.59 |
| Tetrahydrofuran | 0.41 | 3,260 | 9.91 |

The following table reports the results of portland cement clinker ground in a laboratory steel ball mill for 5490 revolutions at 220° F.

TABLE 2

| Additive | Amount of additive, percent solids on solids | Blaine surface area, sq. cm./g. | Percent improvement over blank |
|---|---|---|---|
| Blank | | 3,142 | |
| 2-furaldehyde | 0.012 | 3,290 | 4.70 |

The following table reports the results of grinding portland cement clinker in a laboratory steel ball mill for 5655 revolutions at room temperature.

TABLE 3

| Additive | Amount of additive, percent solids on solids | Blaine surface area, sq. cm./g. | Percent improvement over blank |
|---|---|---|---|
| Blank | | 3,049 | |
| Tetrahydrofuran | 0.041 | 3,354 | 10.0 |
| Tetrahydrothiophene | 0.050 | 3,172 | 4.03 |

The following table illustrates the grinding efficiency of the novel additive when employed in grinding phosphate rock in a laboratory steel ball mill for 3294 revolutions at 220° F.

TABLE 4

| Additive | Amount of additive, percent solids on solids | Blaine surface area, sq. cm./g. | Percent improvement over blank |
|---|---|---|---|
| Blank | | 4,130 | |
| Tetrahydrofurfuryl alcohol | 0.02 | 4,413 | 6.86 |

The following table reports the results of grinding phosphate rock in a laboratory steel mill for 2745 revolutions at 220° F.

TABLE 5

| Additive | Amount of additive, percent solids on solids | Blaine surface area, sq. cm./g. | Percent improvement over blank |
|---|---|---|---|
| Blank | | 4,118 | |
| Tetrahydrofurfuryl alcohol | 0.02 | 4,288 | 4.13 |

The following table represents the results of grinding portland cement clinker at 240° F. at various mill revolutions. In this experiment the increase in grinding efficiency per mill revolution was measured.

TABLE 6

| Additive | Amount of additive percent solids on solids | Blaine surface area, sq. cm/g | Blaine surface area per revolution | Percent improvement over blank |
|---|---|---|---|---|
| Blank | | 3,451 | .7857 | |
| Furfuryl alcohol | 0.015 | 3,370 | .8769 | 11.6 |
| Tetrahydrofurfuryl alcohol | 0.015 | 3,451 | .8980 | 14.3 |

The following table reports two tests illustrating the increase in grinding efficiency obtained with the amine and amine acetate derivatives. Cement clinker was ground at 220° F.

TABLE 7

| Additive | Amount of additive, percent solid on solids | Blaine surface area, sq. cm/g. | Blaine surface area revolution | Percent improvement over blank | Pack set index |
|---|---|---|---|---|---|
| Blank | | 3,182 | .4921 | | 7 |
| Tetrahydrofurfuryl amine | 0.12 | 3,187 | .5229 | 6.26 | 6 |
| Blank | | 3,207 | .4694 | | 8 |
| Tetrahydrofurfuryl amine acetate | .012 | 3,241 | .5033 | 7.22 | 2 |

The above table indicates the grinding efficiency that can be obtained by using the amine and amine acetate derivatives of the grinding aids of the present invention.

The additives of the present invention also provide satisfactory results in grinding other minerals in addition to cement and phosphate rock.

The additive of the present invention is employed preferably as the sole grinding aid, but it should be undertood that it can also be employed with a mixture of one or more grinding aids or in admixture with other additives. A particularly preferred mixture includes sodium phenolate with the additive of the present invention.

What is claimed is:

1. The process of grinding a frangible, inorganic substance selected from the class consisting of cement clinker, phosphate rock, iron ore, beryllium oxide, limestone, gypsum, clay, and bauxite by intergrinding with the said substance a compound selected from the class of furan, tetrahydrofuran, thiophene, tetrahydrothiophene, tetrahydrofurfuryl alcohol, furfuryl alcohol, furfural, dimethylfuran, furfural acetate, furfuraldiacetate, tetrahydrofurfuryl acetate, furoin, hydrofurfurfuramide, tetrahydrsfurfurylamine, and tetrahydrofurfurylamine acetate, in the proportions of from 0.001 to 1%, based on the weight of the frangible substance, whereby improved grinding efficiency results.

2. The process of claim 1 wherein the added compound is employed in the proportion of from 0.004 to 0.04% of the weight of the said frangible substance.

3. The process of claim 1 wherein the frangible substance is cement clinker, and the added compound is tetrahydrofuran employed in the approximate proportion of 0.04 of 1% of the weight of the cement clinker.

References Cited

UNITED STATES PATENTS

| 2,512,067 | 6/1950 | Linford | 106—190 |
| 2,478,831 | 8/1949 | MacPherson | 106—88 |
| 3,068,110 | 12/1962 | Fagubolt | 106—102 |
| 3,325,105 | 6/1967 | Veltman | 241—16 |
| 3,329,517 | 7/1967 | Dodson et al. | 106—90 |

OTHER REFERENCES

Organic Synthesis, Coll. vol. I, p. 274 (1932).

Hartough, Howard, Thiophene and Its Derivatives, pp. 11, 12, and 495 (June 1952).

JAMES E. POER, Primary Examiner

W. T. SCOTT, Assistant Examiner

U.S. Cl. X.R.

106—90, 314; 241—15